United States Patent [19]

Carballo

[11] Patent Number: 5,043,594
[45] Date of Patent: Aug. 27, 1991

[54] HIGH TORQUE-HIGH SPEED UNIVERSAL POWER CONTROL CONSOLE WITH ATTACHED FOOT PEDAL CONTROLLER

[76] Inventor: Rodolfo A. Carballo, 4648 N. Avenida De Cazador, Tucson, Ariz. 85718

[21] Appl. No.: 474,997

[22] Filed: Feb. 5, 1990

[51] Int. Cl.$^5$ ............................................. H02J 3/00
[52] U.S. Cl. ..................................... 307/31; 307/12; 307/38; 338/108; 338/153
[58] Field of Search ................... 338/108, 153; 307/12, 307/13, 15, 31, 32, 33, 34, 35, 38, 39

[56] References Cited

U.S. PATENT DOCUMENTS

| | | | |
|---|---|---|---|
| 3,596,102 | 7/1971 | Brooks | 338/78 |
| 4,162,486 | 7/1979 | Wyler | 307/31 |
| 4,163,906 | 8/1979 | Shimamura | 307/39 |
| 4,322,711 | 3/1982 | Spangler et al. | 338/153 |
| 4,397,251 | 8/1983 | Leutwyler | 338/108 |
| 4,528,456 | 7/1985 | Harris | 307/31 |
| 4,549,274 | 10/1985 | Lerner et al. | 307/35 |

Primary Examiner—A. D. Pellinen
Assistant Examiner—Jeffrey A. Gaffin
Attorney, Agent, or Firm—Victor Flores

[57] ABSTRACT

An operator controlled variable electrical power delivery console and foot pedal controller are provided. The variable electrical power delivery console is designed to supply power to universal motors that are subjected to fluctuating loads that impact the performance of the motor. The invention combines two types of solid state electronic circuits including a selectable power booster circuit that responds to load changes that enables a motor to operate at high torque and another selectable solid state electronic circuit which allows the motor to operate at high speeds and lesser torque demands. The invention includes a selectable auxiliary foot pedal controller that is operator selectable for use with either of the two types of electrical circuits. The foot pedal controller is provided with a mechanical cable linkage that interfaces with a slide type control variable resistor that complements a series connected, rotary actuated linear variable potentiometer located in the console unit, that also controls operation of the two solid state electronic circuits.

12 Claims, 4 Drawing Sheets

HIGH TORQUE-HIGH SPEED UNIVERSAL POWER CONTROL CONSOLE WITH ATTACHED FOOT PEDAL CONTROLLER

RELATED PATENT APPLICATION

This application is related to patent application entitled: "ELECTRONIC FOOT PEDAL CONTROLLER WITH BOOSTER POWER FOR UNIVERSAL MOTORS" being filed concurrently with and on even date as this patent application by the same applicant.

FIELD OF THE INVENTION

This invention relates to operator controlled variable ac power delivery apparatus and methods for controlling the delivery of the ac power. More particularly, the present invention relates to variable speed motor control apparatus used to supply power to universal motors that are subjected to fluctuating loads that impact the speed performance of the motor. Even more particularly, the present invention relates to variable motor control apparatus used to supply power to universal motors which have power booster circuits that respond to load changes to minimize the speed drop performance that impact on the universal motors due to the load change and that, selectably interfaces with an auxiliary foot pedal controller to facilitate manual or foot control.

DESCRIPTION OF THE PRIOR ART

There are certain tasks performed by craftspersons that require precision speed control of the operation of the hand tool being used. Typically, the tools used by craftpersons involves electrically powered hand tools, such as hand drills, sanders, jigsaws, buffers, polishers, or other electrically powered hand tools such as those used in jewelry crafts, namely flexible shaft motors, wax guns, and others small power tools employing universal (brush type) motors. Ac power receptacles, having several ac outlets are commonly employed when utilizing the aforementioned power hand tools to interface to the main building power source. These power receptacles are merely an extension of the wall outlet and often include an on/off switch and noise filtering means to block electrical noise. Other devices often employed in interfacing with these power hand tools are variac devices that can be controlled to deliver a predetermined percentage of line voltage to the power hand tool. These variac devices tend to be expensive and do not compensate for load changes often seen by the electrically coupled power hand tool and therefore degrading the motor performance.

A commonly employed motor control circuit typically includes a full wave triac and diac bilateral trigger (bidirectional semiconductor) devices, a charging capacitor and potentiometer that is used to control the charging voltage on the capacitor that biases the diac and the firing of the triac that couples the full wave of the line voltage to a motor. The speed of the motor is controlled by adjusting the potentiometer throughout its ohmic range thus defining the time constant of firing. With this type of motor control circuit, the current delivered to the motor is limited by the triac element via the charge voltage maintained on the capacitor that triggers the diac. If there is an applied load change, speed and torque of the motor are drastically affected due to the inability of the motor control circuit to respond to the applied load.

The sensitivity and responsiveness of the potentiometer employed in the motor control circuit can greatly affect the motor control. In some applications, a foot pedal controller having an integral potentiometer is employed in combination with the above described motor control circuit. An example of this type of pedal controller is taught by U.S. Pat. No. 4,322,711, wherein a rotary potentiometer accommodates a helical member that travels within the rotary potentiometer to produce the variable resistance that generates the charging voltage at the capacitor in the motor control circuit. Although, the foot pedal controller taught in the '711 patent is inteded to provide a smooth, accurate and a wide range controllable change in motor speeds, certain craft tasks demand even greater control over the motor's speed and torque. For example, an operator may wish to operate the motor at a preselected limited speed, independent of any foot pedal control, or an operator may wish to have a preselected limited speed that is controlled by the foot pedal. Also, the smoothness of the potentiometer's mechanical ability to vary the resistance to produce linear voltage changes, as opposed to exponential voltage changes, is believed to be a significant factor in the design of an auxillary foot pedal controller. To effect such a linear voltage change, a precision rotary, linear responding potentiometer in series with a slide control variable resistor, preferably with a foot pedal controller, is believed to produce the improved motor control often required in the crafts.

Notwithstanding improvements to achieve improved speed control by using precision potentiometers, motor control networks and standard light-dimmer types, these improvement alone do not satisfy the desired operator control over the operation of the motor in that they do not compensate for the applied load changes that impact torque and speed of the motors being employed.

Therefore, a need is seen to exist for a motor control apparatus that not only includes a linear variable voltage potentiometer and slide control variable resistor in a foot pedal power controller, but that also incorporates a power booster solid state network that compensates for applied load changes seen by the coupled universal motor that operates at high torque without impacting speed and retaining a constant speed independently of the applied load variations.

SUMMARY OF THE INVENTION

Accordingly, the primary object of the present invention is to provide a motor control apparatus that couples to hand tools, of the type discussed above driven by an electrically powered universal motor, which motor control apparatus has an operator controlled linear variable voltage potentiometer for setting a desired operating voltages, that accommodates an auxillary foot pedal controller and that has a selectable power booster circuit feature that allows the coupled tool to operate under high torque and constant speed conditions.

A related object of the present invention is to provide a foot pedal controller apparatus having a mechanical cable linkage that interfaces with a slide type control variable resistor that complements the series connected, rotary actuated, yet linear variable voltage producing, potentiometer.

Another object of the present invention is to provide a method of controlling the speed and torque of universal electric motors using the apparatus of the present invention.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
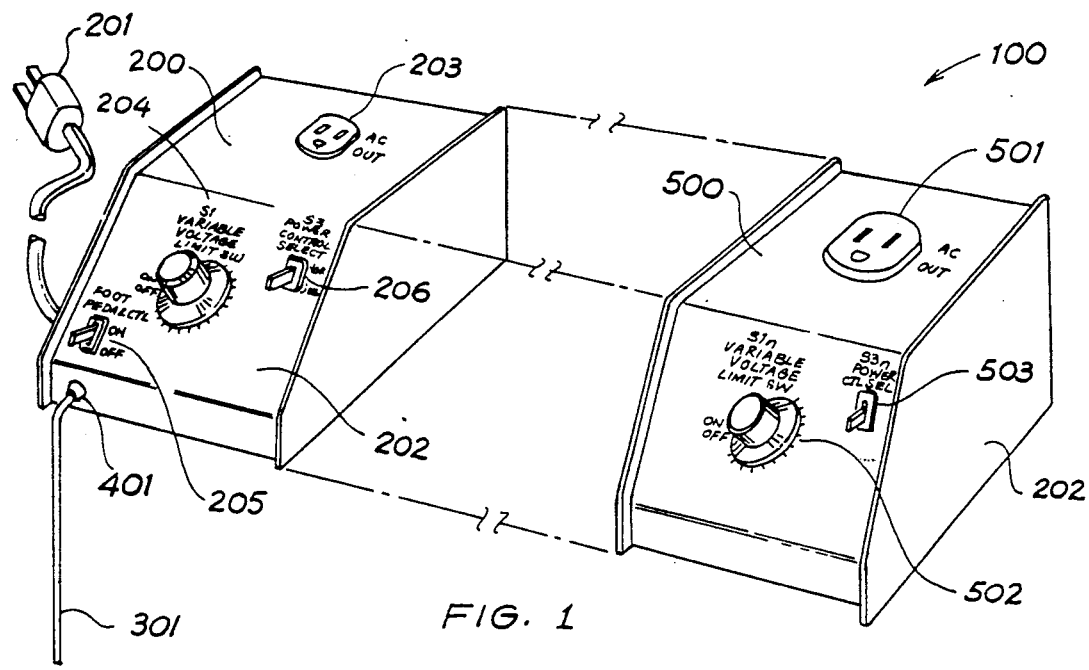
FIG. 1 is a perspective view of the present invention illustrating a motor control workstation including a bench power control member having operator controlled and selectable power function features and an auxillary foot pedal controller.

Referring first to FIG. 1 where an electrical power control center workstation 100 is illustrated showing a cascaded bench member unit comprising of a plurality of power control output stages 200 and 500 sharing a common enclosure 202 wherein unit 200 has hand/foot operator power controls 204 and 300 and unit 500 only has hand power control 502 substantially equivalent to control 204. Workstation 100 also comprises a power cord 201 for coupling to any suitable power source (not shown) and an interface cable 301 exiting workstation 100 at a convenient exit port 401 for electrically coupling foot pedal controller 300, wherein hinged foot pedal member 303 manipulates a slide control variable resistor 307 (see FIG. 2). Also included in workstation 100 are output receptacles 203, 501 that provide output means for delivering controlled power to an electrical appliance, such as a tool employing a universal motor M depicted in FIG. 3. Power control unit 200 is shown having an operator selectable foot pedal select switch 205 and a normal or booster mode select switch 206.

Figure 2:
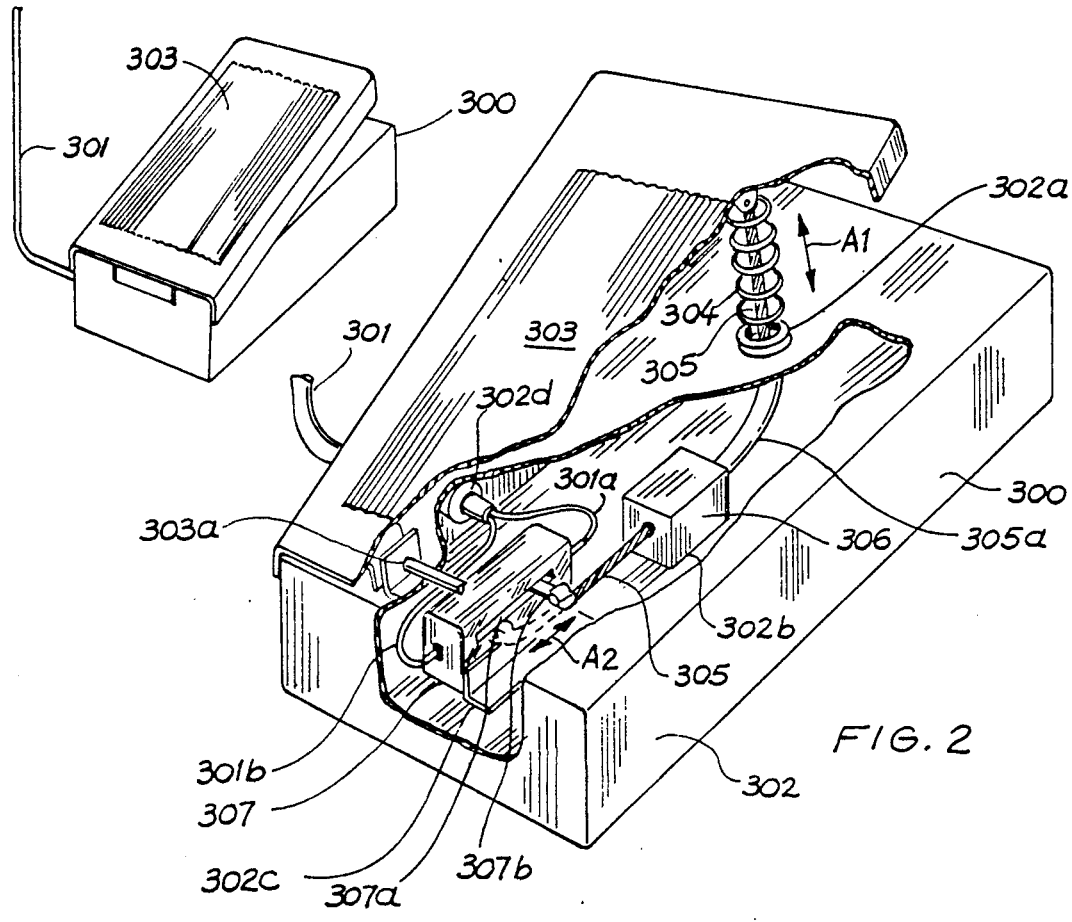
FIG. 2 is an enlarged cutaway view of the foot pedal controller according to the present invention illustrating the mechanical arrangement used to control the slide control variable resistor connectable in series with the variable voltage limit switch.

FIG. 2 shows the preferred embodiment for the design of a foot pedal controller 300 that provides the additional operator control over the delivery of power to a coupled electrical tool. Foot pedal controller 300 comprises input cord 301 having leads 301a and 301b that enter base enclosure 302 at 302d and that electrically interfaces a slide control variable resistor 307, anchored at 302c, with control circuitry in unit 200 (see FIGS. 3 and 5). To achieve enhanced operator foot pedal control a flexible cable mechanical linkage is provided. The linkage comprises foot pedal member 303 having an upper end portion of spring member 304 attached thereto and to the top portion of base enclosure 302. Encircled within spring member 304 is steel cable 305 that enters enclosure 302 at 302a and into guide sheathing 305a and stop guide block 306 anchored at 302b and out of stop guide block 306 to connect with electrically isolated linear motion slide control tab 307b. In operation, pedal 303 is depressed by an operator, as shown by arrow A1 and enabled by hinge means 303a, which action urges cable 305 through guides 305a and block 306 and resultant movement of tab 307b within slide 307a as indicated by arrow A2. The electrical effects of such manipulation of slide control element 307b will be discussed below.

Figure 3:
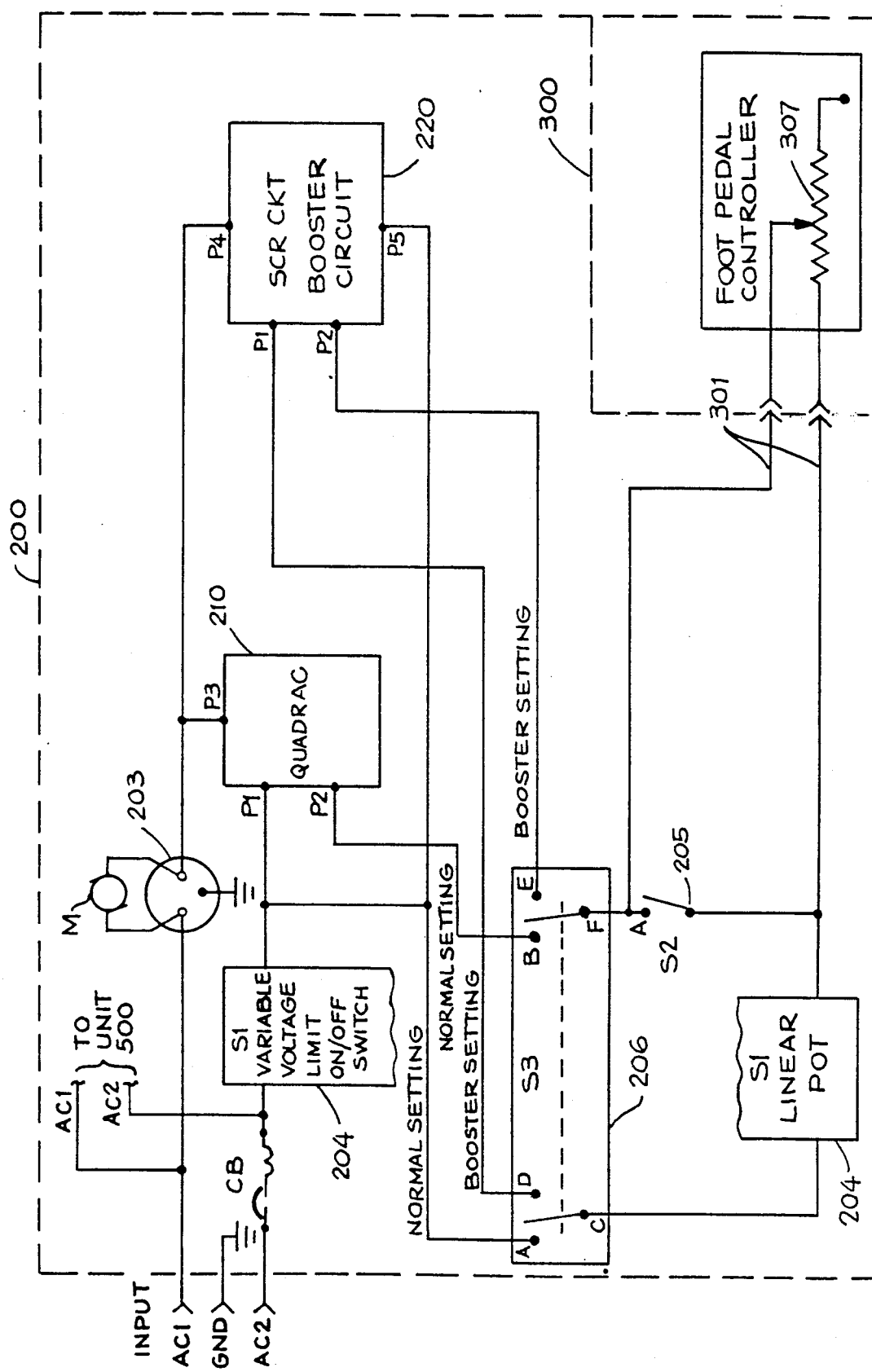
FIG. 3 is a block diagram representation of the circuitry employed within the bench power control member and the attachable foot pedal controller.

The power control network of the present invention is a combination motor control circuit comprising a triac/diac-type (quadrac) motor control circuit and a solid state network/scr booster motor control, both of which are further enhanced by the foot pedal controller of the present invention. Further, the same combination motor control circuit can be packaged to be made operational without the auxilliary foot pedal controller. FIG. 3 illustrates in block diagram form the combination circuit employed in unit 200, comprising quadrac 210 (triac/diac) and solid state booster network 220. Input power, such as single phase power having line voltage made up of ac1 and ac2 and a ground connection gnd, is received into unit enclosure 202 where a thermal circuit breaker CB protects workstation 100 from electrical overloads and short circuit conditions. The line voltage is paralleled to other cascaded units to add versatility to the workstation, such as to unit 500 that have substantially similar motor control circuits, such as the circuit depicted in FIG. 4. that does not couple to an auxilliary foot pedal controller. It should be understood that motor control stage unit 200 may be duplicated to provide other foot pedal controlled motor controlled units.

Figure 4:
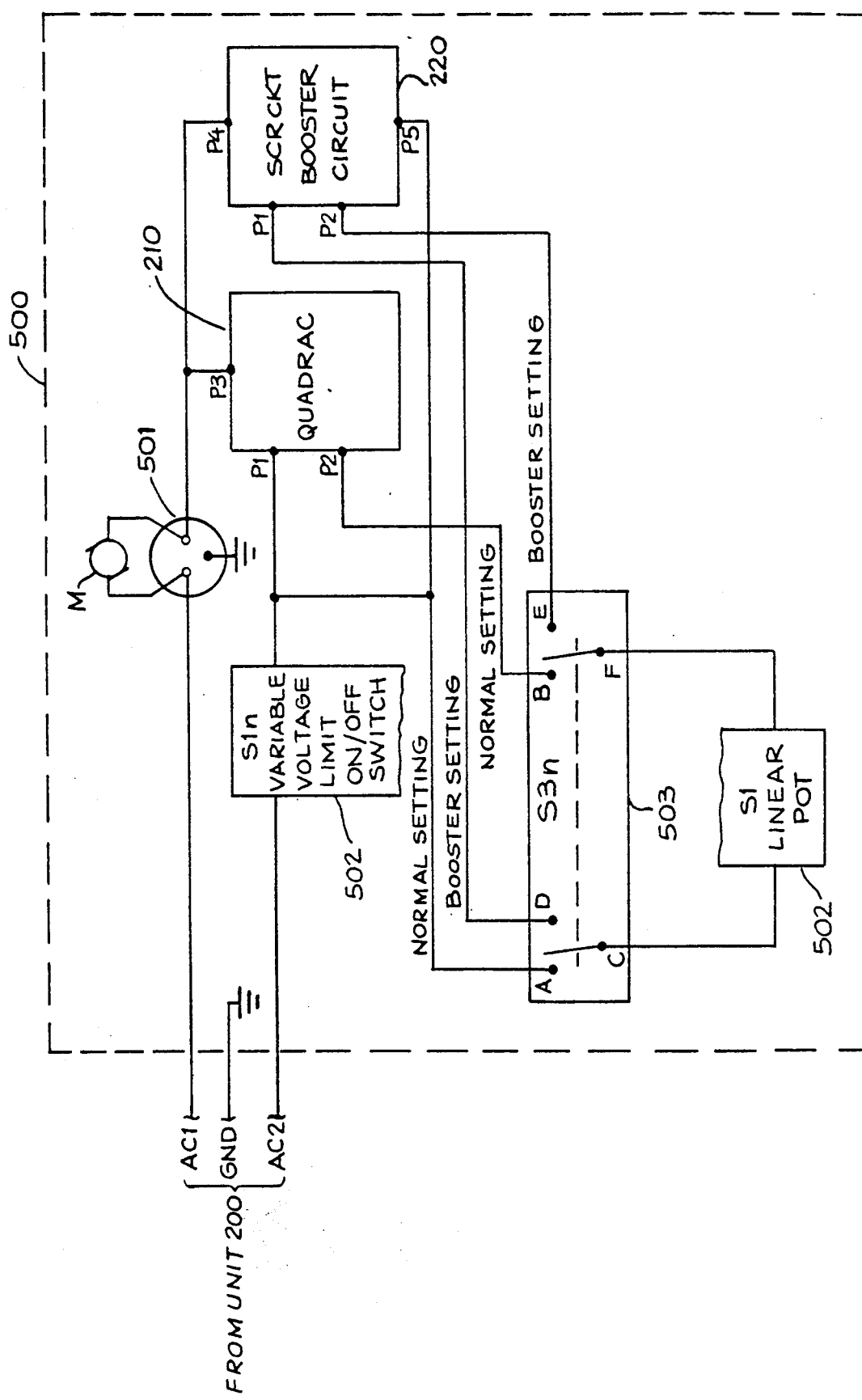
FIG. 4 is a block diagram representation of a cascaded power control member within the bench power control member without the auxilliary foot pedal controller.
Figure 5:
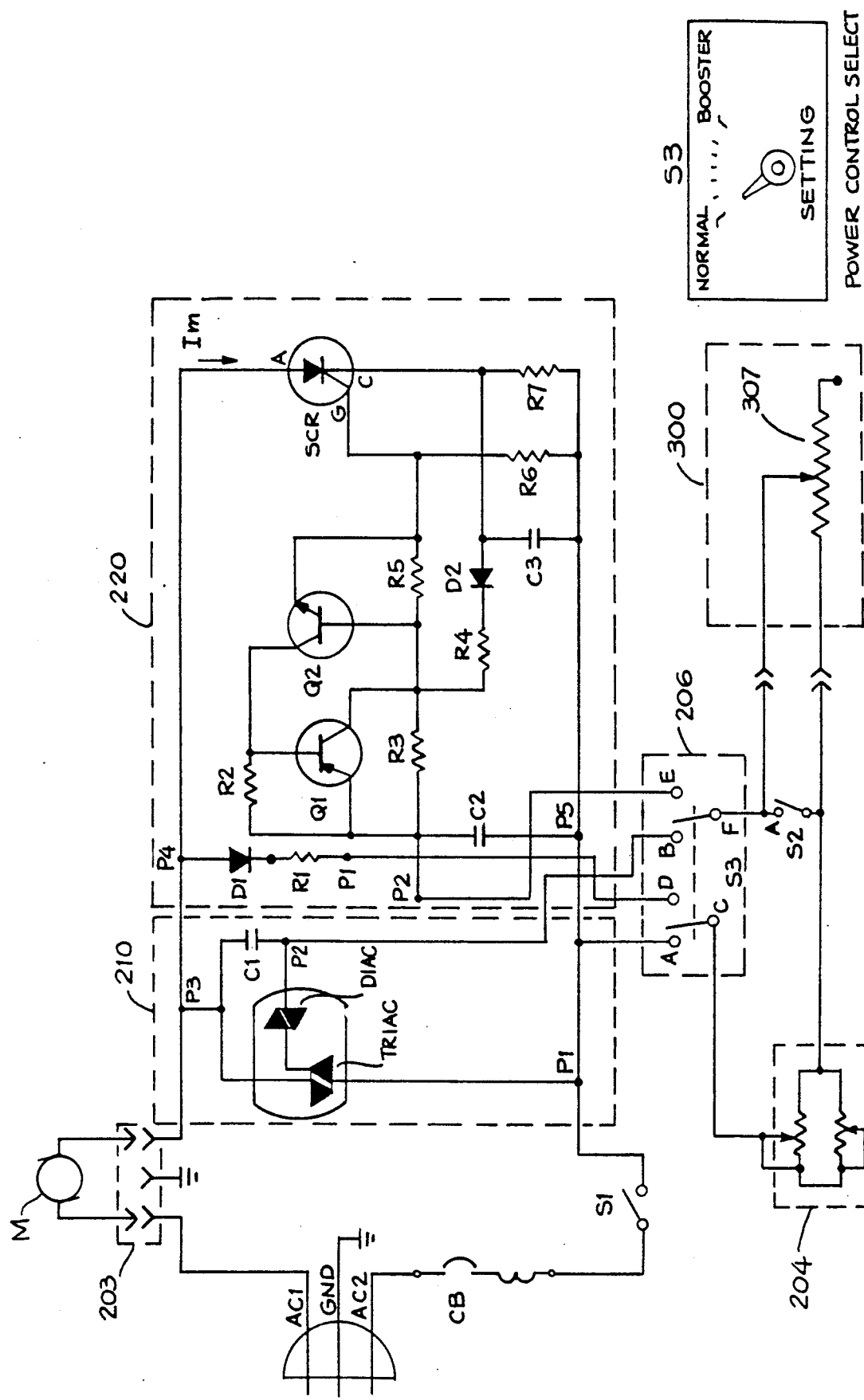
FIG. 5 is a detailed circuit schematic of the foot pedal controller and a motor control stage power stage according to the present invention.

Referring now to FIGS. 3, 4 and 5 to understand the operation of the present invention, power is available at switch S1, S1n (numerals 204, 502) for distributing line voltage to electrically connected motor M via output receptacles 203, 501. Depending upon the setting of switch S2 (numeral 205 FIGS. 3 and 5 only), the operator can select the functionality of foot pedal controller 300, i.e. to be selected or bypassed. Further, depending upon the setting of power-mode select switch S3, S3n (numeral 206, 503), the operator can select the type of power that will operate the electrically coupled motor, i.e. normal or booster power, according to the anticipated load condition of the task at hand. Switch S1, S1n are preferably a rotary type linear potentiometer that includes an on/off switch portion and a linear potentiometer member that precludes exponential voltage control changes from being applied to the motor and that allows an operator to preset a voltage limit of operation according to a dial template setting corresponding to switch/potentiometer 204, 502 settings desired. Assuming the task at hand requires normal power (S3, S3n set to positions A and B, which switch can be a properly rated double pole, double throw commercially available power switch) and that switch S2 (which switch can be any properly rated single pole, single throw power switch) is in an open state to allow slide potentionmeter 307 to be functionally in the circuit. Foot pedal controller potentiometer 307 is initially set at maximum resistance, typically 500K ohms, i.e. no current flow to motor M is possible. When switch S1 is rotated ON and set to a desired percentage of line voltage, power is available at terminal P1 of quadrac 210 awaiting firing of the triac by the operator depressing pedal 303 to urge cable 305 and tab 307b away from maximum resistance. The urging of potentiometer tab 307b incrementally starts charging of capacitor C1 via terminal P2 of quadrac 210. The charge on C1 builds to a sufficiently high voltage (generally 25 vac for a 120 vac input voltage and also according to a time constant which is a function of the value of the capacitor C1 and the combined serial resistance of the rotary potentiometer 204 or 502 and the slide control setting of linear variable voltage potentiometer 307) that will bias the diac ON, which allows the voltage at C1 to couple through the diac to fire the triac ON, and thus provide the variable voltage to the connected motor M via terminal P3 of quadrac 210. Because the network, as discussed to now, will only provide high speed control, a torque control network as described below is desirable. If switch S2 is closed to bypass the foot controller, then the setting on potentiometer 204 will determine the variable voltage to be delivered to the motor. Capacitor C1 is selected having a value of 0.12 microfarads.

Assuming that the task at hand requires high torque from motor M, then, the operator will activate booster circuit 220 by switching switch S3, S3n to positions D and E which couple to terminals P1 and P2, respectively, of booster circuit 220. If the craftsperson operator is using power control unit stage 200, then power is available at outlet 203 and the operator can select the use of foot pedal controller 300 by toggling switch S2. In the power booster mode of operation, The overall network is half wave rectified to the motor. The rectifier diode D1 also provides half wave rectified voltage that charges capacitor C2 according to values of limited current resistor R1 (typically 1K ohm) and the setting of the linear potentiometer 204 and foot pedal slide resistor 307, if switched in. Capacitor C2 functions to provide the necessary voltage to bias through the high impedance network comprised of Q1 and Q2, which when switched On this network become a very low impedance network to fire gate G of the SCR to cause current to flow through terminals P4 and P5 of booster circuit 220 (R2 and R6 selected at 470 ohms and R5 selected at 1K ohm). Once the SCR is turned ON, capacitor C2 would normally discharge to the point of turning Q1 and Q2 back to a high impedance state and the SCR OFF. However, by utilizing resistor R7 as a sense element for sensing motor current Im, when a mechanical load is applied, the network 220 provides a means to regulate the charging condition of capacitor C3 via the sense voltage across R7 (selected at 0.5 ohms) to turn ON diode D2 every half cycle and thus provide an additional voltage level at C2, to keep the SCR turned ON harder and thus provide higher power output at the motor's terminals (R3 selected at 12K ohms and R4 selected at 5.6K ohms). Potentiometer 204 controls the maximum applied voltage to motor M and foot pedal controller 300 controls the delivery of the voltage when it is connected in series with potentiometer 204. Capacitors C2 and C3 are selected having values 0.47 micrfarads and 4.7 microfarads, respectively. Input voltages are not specifically enumerated but suffice it to state that component values can selected to accommodate worldwide ac voltages at respective 50 or 60 hertz, or appropriate dc voltage inputs.

Therefore, while the present invention has been shown and described herein in what is believed to be the most practical and preferred embodiments, it is recognized that departures can be made therefore within the scope of the invention, which is therefore not to be limited to the details disclosed therein but is to be accorded the full scope of the claims so as to embrace any and all equivalent apparatus.

I claim:

1. An electrical power control apparatus, said apparatus comprising:
    a plurality of controllable power output unit means for providing variable output voltage to electrical appliances, each one of said plurality of controllable power output unit means having a selectable first circuit means responsive to a first loading condition on said electrical appliance and a selectable second circuit means responsive to a second loading condition on said electrical appliance; and
    foot pedal controller means electrically coupled to at least one of said plurality of controllable power output unit means for controlling energizing said electrical appliance.

2. An electrical power control apparatus as recited in claim 1, wherein, said foot pedal controller comprising:
    slide linear motion variable resistor means for controlling energizing of said first and second circuit means;
    flexible steel cable means coupled to a foot pedal member for controllably urging a slide tab member of said variable resistor means from a shut-off electrical state throughout an ohmic range of operation of said variable resistor means;
    a first guide means for directing said flexible steel cable towards said slide tab member;
    a second guide means for further directing said flexible steel cable towards said slide tab member; and
    spring means for de-compressably returning said slide tab to said shut-off electrical state by acting on said flexible steel cable.

3. An electrical power control apparatus as recited in claim 1, wherein, said first circuit means comprising:
    bidirectional semiconductor devices responsive to a trigger voltage controllably generated by a capacitor;
    first potentiometer means for controllably enabling charging of said capacitor and for setting a limited output voltage; and
    selectable second potentiometer means located in said foot controller means for further controlling said charging of said capacitor.

4. An electrical power control apparatus as recited in claim 3, wherein, said foot pedal controller comprising:
    said selectable second potentiometer mean comprising a slide linear motion variable resistor means for selectively controlling energizing of said first and second circuit means;
    flexible steel cable means coupled to a foot pedal member for controllably urging a slide tab member of said variable resistor means from a shut-off electrical state throughout an ohmic range of operation of said variable resistor means;
    a first guide means for directing said flexible steel cable towards said slide tab member;
    a second guide means for further directing said flexible steel cable towards said slide tab member; and
    spring means for de-compressably returning said slide tab to said shut-off electrical state by acting on said flexible steel cable.

5. An electrical power control apparatus as recited in claim 1, wherein, said second circuit means comprising:
    half wave rectifier means for energizing said second circuit means;

first potentiometer means coupled to said half wave rectifier means for controllably changing an impedance state of a pair of bipolar semiconductor elements and controlling an on-off electrical state of a unidirectional semiconductor device that allows current flow to a coupled electrical appliance;

current sense means coupled to said unidirectional semiconductor device and being responsive to said current flow for prolonging a low impedance state of said pair of bipolar semiconductor elements to enable high torque performance from said electrical appliance; and selectable second potentiometer means located in said foot controller means for further controlling said impedance state of said pair of bipolar semiconductor elements.

6. An electrical power control apparatus as recited in claim 5, wherein, said foot pedal controller comprising:

said selectable second potentiometer mean comprising a slide linear motion variable resistor means for selectively controlling energizing of said first and second circuit means;

flexible steel cable means coupled to a foot pedal member for controllably urging a slide tab member of said variable resistor means from a shut-off electrical state throughout an ohmic range of operation of said variable resistor means;

a first guide means for directing said flexible steel cable towards said slide tab member;

a second guide means for further directing said flexible steel cable towards said slide tab member; and spring means for de-compressably returning said slide tab to said shut-off electrical state by acting on said flexible steel cable.

7. An electrical power control apparatus, said apparatus comprising:

a plurality of controllable power output unit means for providing variable output voltage to electrical appliances, each one of said plurality of controllable power output unit means having a selectable first circuit means responsive to a first loading condition on said electrical appliance and a selectable second circuit means responsive to a second loading condition on said electrical appliance; and foot pedal controller means electrically coupled to at least one of said plurality of controllable power output unit means for controlling energizing said electrical appliance, said foot pedal controller comprising:

slide linear motion variable resistor means for controlling energizing of said first and second circuit means, flexible steel cable means coupled to a foot pedal member for controllably urging a slide tab member of said variable resistor means from a shut-off electrical state throughout an ohmic range of operation of said variable resistor means, a first guide means for directing said flexible steel cable towards said slide tab member, a second guide means for further directing said flexible steel cable towards said slide tab member, and spring means for de-compressably returning said slide tab to said shut-off electrical state by acting on said flexible steel cable.

8. An electrical power control apparatus as recited in claim 7, wherein, said first circuit means comprising:

bidirectional semiconductor devices responsive to a trigger voltage controllably generated by a capacitor;

first potentiometer means for controllably enabling charging of said capacitor and for setting a limited output voltage; and switching means for selecting said slide linear motion variable resistor means for further controlling said charging of said capacitor.

9. An electrical power control apparatus as recited in claim 8, wherein, said second circuit means comprising:

half wave rectifier means for energizing said second circuit means;

said first potentiometer means coupled to said half wave rectifier means for controllably changing an impedance state of a pair of bipolar semiconductor elements and controlling an on-off electrical state of a unidirectional semiconductor device that allows current flow to a coupled electrical appliance;

current sense means coupled to said unidirectional semiconductor device, said current sence means being responsive to said current flow for prolonging a low impedance state of said pair of bipolar semiconductor elements to enable high torque performance from said electrical appliance; and switching means for selecting said slide linear motion variable resistor means for further controlling said impedance state of said pair of bipolar semiconductor elements.

10. An electrical power control apparatus as recited in claim 7, wherein, said second circuit means comprising:

half wave rectifier means for energizing said second circuit means;

first potentiometer means coupled to said half wave rectifier means for controllably changing an impedance state of a pair of bipolar semiconductor elements and controlling an on-off electrical state of a unidirectional semiconductor device that allows current flow to a coupled electrical appliance;

current sense means coupled to said unidirectional semiconductor device, said current sence means being responsive to said current flow for prolonging a low impedance state of said pair of bipolar semiconductor elements to enable high torque performance from said electrical appliance; and switching means for selecting said slide linear motion variable resistor means for further controlling said impedance state of said pair of bipolar semiconductor elements.

11. A method of controlling delivery of power to an electrical appliance, said method comprising the steps of:

(a) providing an electrical apparatus for interfacing with said electrical appliance, said electrical appliance comprising:

a plurality of controllable power output unit means for providing variable output voltage to said electrical appliance, each one of said plurality of controllable power output unit means having a selectable first circuit means responsive to a first loading condition on said electrical appliance and a selectable second circuit means responsive to a second loading condition on said electrical appliance, and foot pedal controller means electrically coupled to at least one of said plurality of controllable power output unit means for controlling energizing said electrical appliance;

(b) selecting said first circuit means for delivering power to said electrical appliance operating under said first loading conditions;

(c) selecting utilization of said foot pedal controller and depressing a foot pedal member of said foot pedal controller for providing additional control in said delivery of power to said electrical appliance operating under said first loading conditions;

(d) selecting said second circuit means for delivering power to said electrical appliance operating under said second loading conditions; and (e) selecting utilization of said foot pedal controller and depressing a foot pedal member of said foot pedal controller for providing additional control in said delivery of power to said electrical appliance operating under said second loading conditions.

12. A method of controlling delivery of power to an electrical appliance as recited in claim 11, wherein said step of providing said foot pedal controller comprises providing:

a slide linear motion variable resistor means for controlling energizing of said first and second circuit means;

flexible steel cable means coupled to a foot pedal member for controllably urging a slide tab member of said variable resistor means from a shut-off electrical state throughout an ohmic range of operation of said variable resistor means;

a first guide means for directing said flexible steel cable towards said slide tab member;

a second guide means for further directing said flexible steel cable towards said slide tab member; and spring means for de-compressably returning said slide tab to said shut-off electrical state by acting on said flexible steel cable.

* * * * *